April 12, 1932.  P. W. CUMMINGS  1,853,667
METHOD OF AND MEANS FOR GRINDING CUTTER BLADES
Filed Sept. 28, 1927  6 Sheets-Sheet 4

Inventor
Preston W. Cummings
By
Chindahl Parker & Carlson
Atty's.

April 12, 1932. P. W. CUMMINGS 1,853,667
METHOD OF AND MEANS FOR GRINDING CUTTER BLADES
Filed Sept. 28, 1927 6 Sheets-Sheet 5
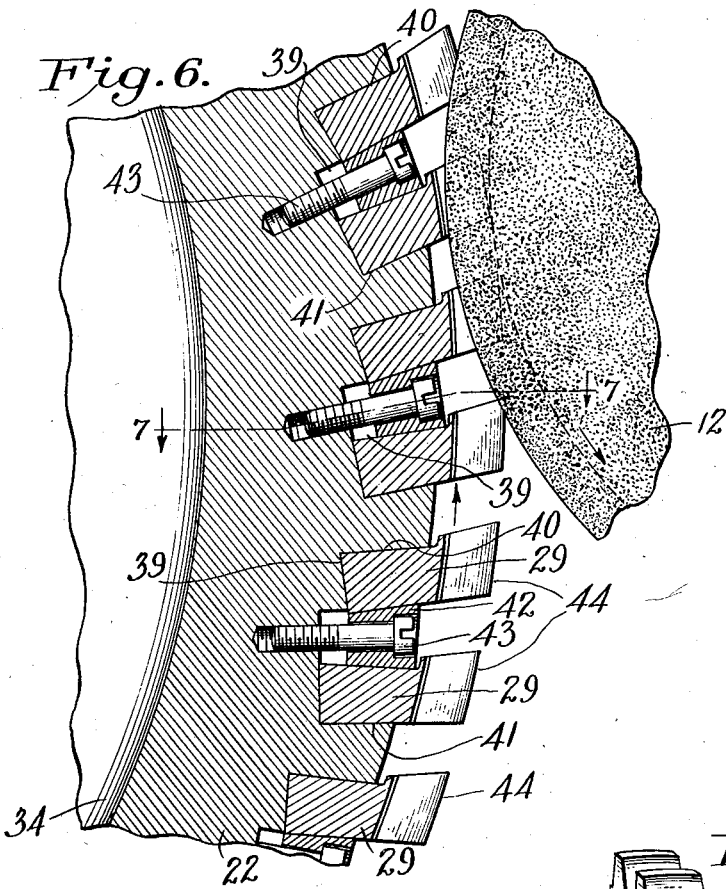
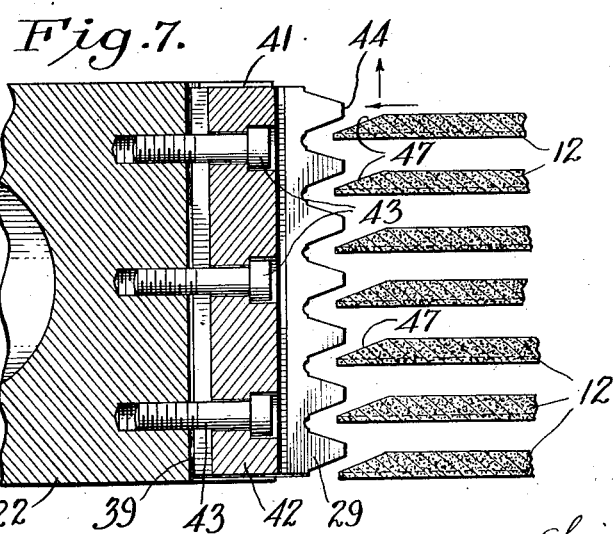
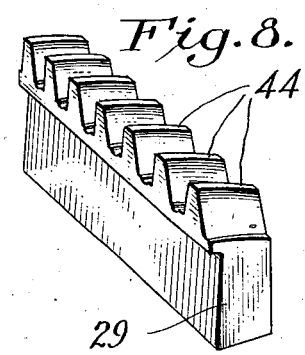
Inventor
Preston W. Cummings
By
Chindahl Parker & Carlson
Atty's.

Patented Apr. 12, 1932

1,853,667

UNITED STATES PATENT OFFICE

PRESTON W. CUMMINGS, OF ROCKFORD, ILLINOIS, ASSIGNOR TO BARBER-COLMAN COMPANY, OF ROCKFORD, ILLINOIS, A CORPORATION OF ILLINOIS

METHOD OF AND MEANS FOR GRINDING CUTTER BLADES

Application filed September 28, 1927. Serial No. 222,489.

The invention relates generally to the making of gear cutters and more particularly to the making of gear cutters of the inserted tooth type.

It is the object of the invention to provide a method of and means for making a gear cutter which obviates the slow and expensive operation of relieving the cutter teeth by the backing-off method and which lends itself particularly to the production of accurately ground cutters.

Another object is to provide an improved method of making gear cutters which is readily adapted for making accurately and rapidly, cutters with a large number of teeth.

It is another object of the invention to provide an improved method and apparatus whereby teeth are formed with a circular relief contour in a continuously rotatable grinding fixture and then repositioned in a cutter body at the desired clearance angle.

It is a further object of the invention to provide a method of making gear cutters whereby the teeth will be provided with slightly greater clearance on one side.

In pursuance of the foregoing objects I aim to provide a method of and apparatus for making gear cutters whereby sets of blank teeth are positioned in a rotatably mounted fixture with the top of the teeth set substantially in the periphery of a circle having a radius equal approximately to the average radius of a standard spirally formed tooth and with the teeth preferably off-set slightly from an axial plane, grinding the teeth by means of a plurality of grinding wheels which have previously been dressed to the proper contour, while the fixture is continuously rotated and resetting the ground teeth in the cutter body at the desired clearance angle.

Further objects and advantages of my invention will become apparent as the description proceeds.

In the drawings:

Fig. 6 is a section along the line 6—6 of Fig. 2.

Fig. 7 is a section along the line 7—7 of Fig. 6.

Fig. 8 is a perspective view of the toothed element.

Figure 1:
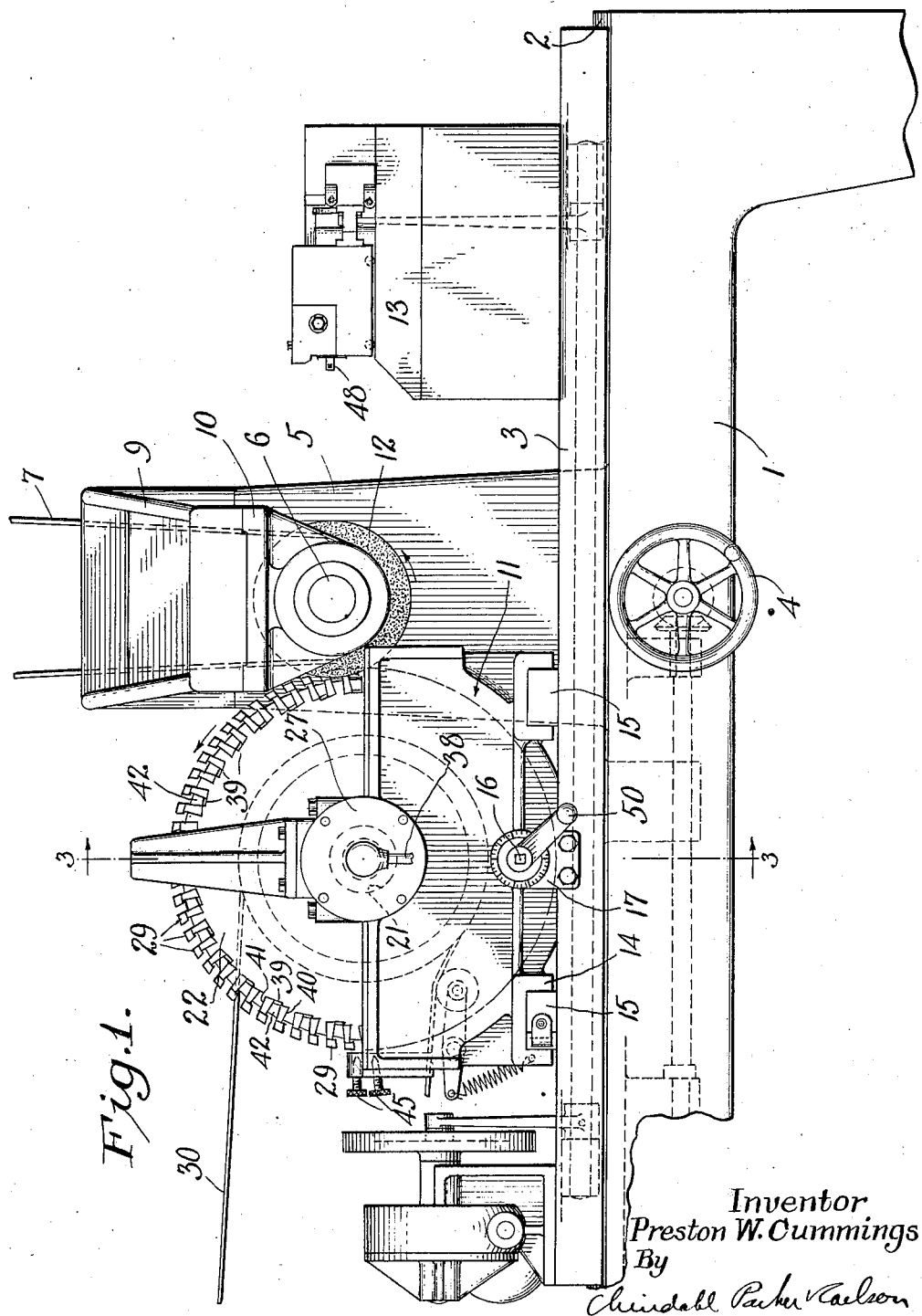
Figure 1 is a fragmental elevation of a preferred form of apparatus embodying and adapted to utilize the invention.

While my invention is susceptible of embodiment of many different forms, I have shown in the drawings and will herein describe in detail one such embodiment with the understanding that the present disclosure is to be considered as an exemplification of the principles of the invention and is not intended to limit the invention to the embodiment illustrated. The scope of the invention will be pointed out in the appended claims.

In the embodiment of the invention illustrated in the drawings, 1 indicates the base frame of a machine upon the ways 2 of which a table or carriage 3 is slidable longitudinally. Suitable mechanism of a well known character may be provided for reciprocating said carriage, said mechanism being considered as including a hand wheel 4 to permit of manual operation. Upon a column like structure 5 which extends upwardly from the base 1, an abrasive wheel arbor 6 is rotatably mounted and may be driven as by means of a belt 7 and pulley 8 from any convenient source of power. Preferably the column is provided with an arm 9 carrying an outboard bearing 10 for the arbor.

Figure 2:
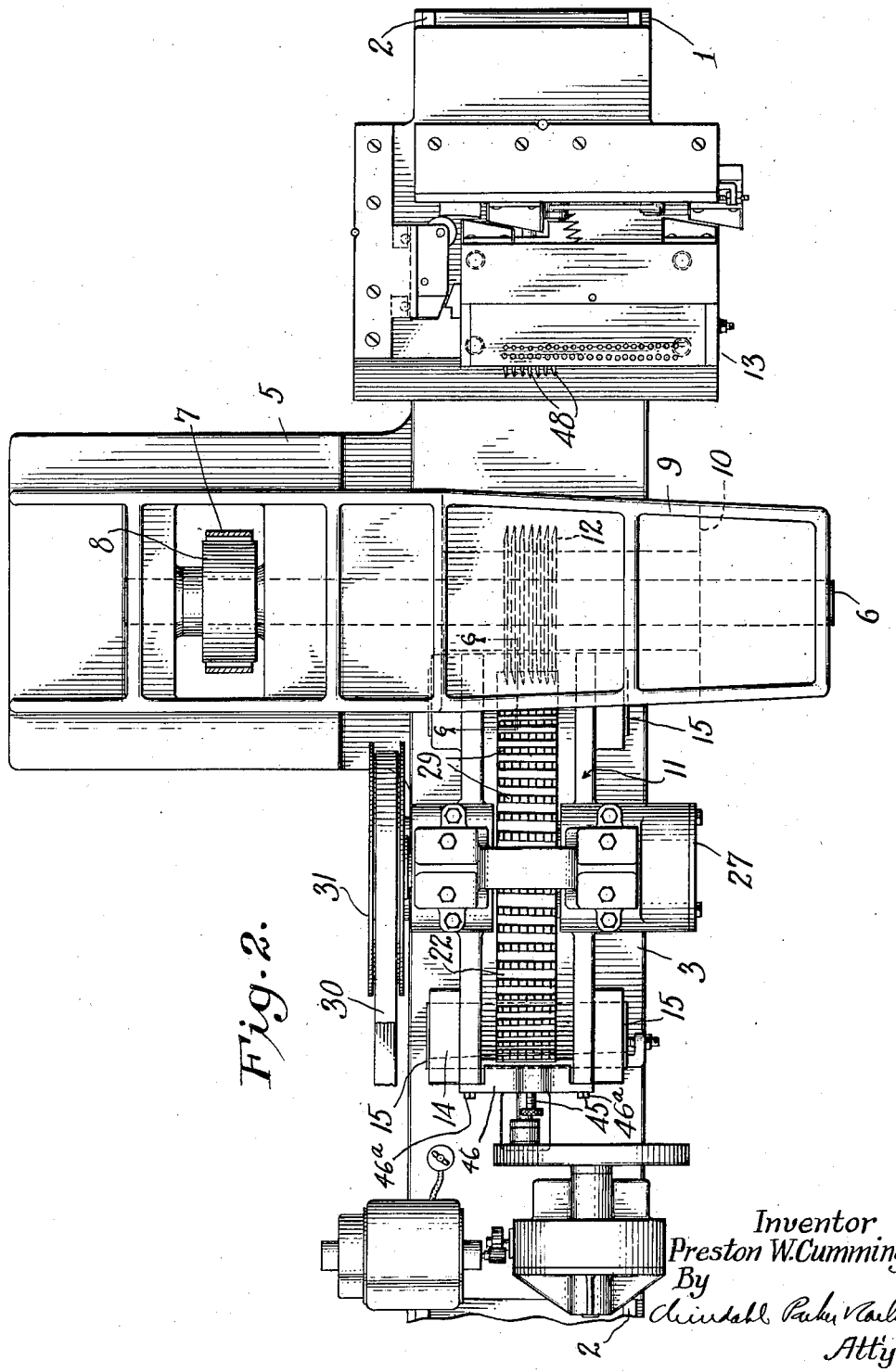
Fig. 2 is a plan view thereof.

As shown in Figs. 1 and 2 a grinding fixture supporting structure 11 is mounted upon the carriage 3 to one side of the arbor 6 upon which arbor a plurality of abrasive wheels 12 are supported, and a dressing mechanism 13 for the abrasive wheels is mounted on the carriage 3 to the other side of the wheels so that by moving the carriage to the left the wheels may be dressed and then by returning the carriage to the right the cutter teeth may be ground as hereinafter more fully described.

Figure 3:
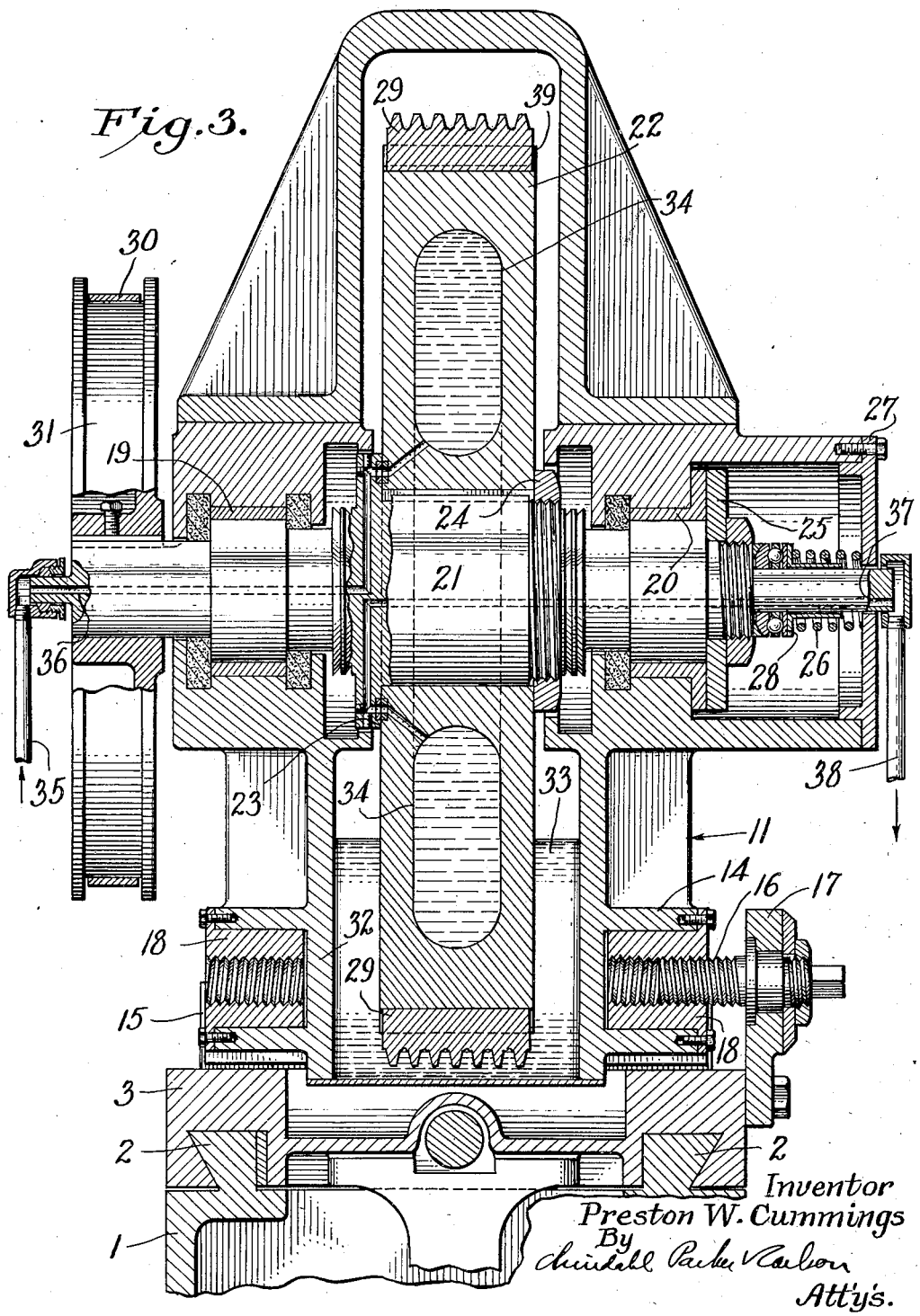
Fig. 3 is a section along the line 3—3 of Fig. 1.

The supporting structure 11 as illustrated herein comprises a base portion 14 which is slidably mounted on a pair of guides 15 for movement transversely of the carriage 3. This base portion is arranged to be adjusted laterally of the table by means of a feed screw 16 (Fig. 3) rotatably mounted in a bearing bracket 17 secured to the carriage. The fixture support 11 is adapted to be secured on the carriage in the position shown in Fig. 3 and is also adapted to be mounted in a reverse position, nuts 18 being provided one on each side of the fixture for engagement with the feed screw.

Rotatably mounted in bearings 19 and 20 on the support 11 is a shaft 21 upon which a fixture 22 may be secured against a shoulder 23 by means of a nut 24. To prevent end play or axial shifting of the shaft a thrust bearing 25 is provided at one end, engagement of this thrust bearing being insured by means of an expansible coil spring 26 secured between a cap plate 27 and a ball thrust bearing 28.

Sets of cutter teeth 29 to be ground are presented about the periphery of the fixture 22, it being contemplated that the fixture will be driven continuously during the grinding operation in the direction indicated in Fig. 1, as by means of a belt 30 extending from a suitable prime mover (not shown) to a pulley 31 on the shaft 21. The lower portion of the base structure 14 is preferably in the form of a housing 32 arranged to contain a coolant 33 and in order to dissipate the heat generated during the grinding operation the fixture 22 may be provided with an internal reservoir 34 through which water or other coolant may be circulated from an intake pipe 35 through a passage 36 in the shaft 21 and out through a passage 37 in the shaft, and a discharge pipe 38.

The periphery of the fixture 22 is provided with a plurality of lateral grooves 39 of a form such that a pair of tooth elements 29 may be positioned against the opposite sides 40, 41 thereof and secured therein by means of a wedge 42 secured to the fixture by means of a bolt device 43. When so positioned the crown 44 of each tooth element forms a portion of a circle so that during the grinding operation the crown and sides of the teeth are given a circular form.

Figure 4:
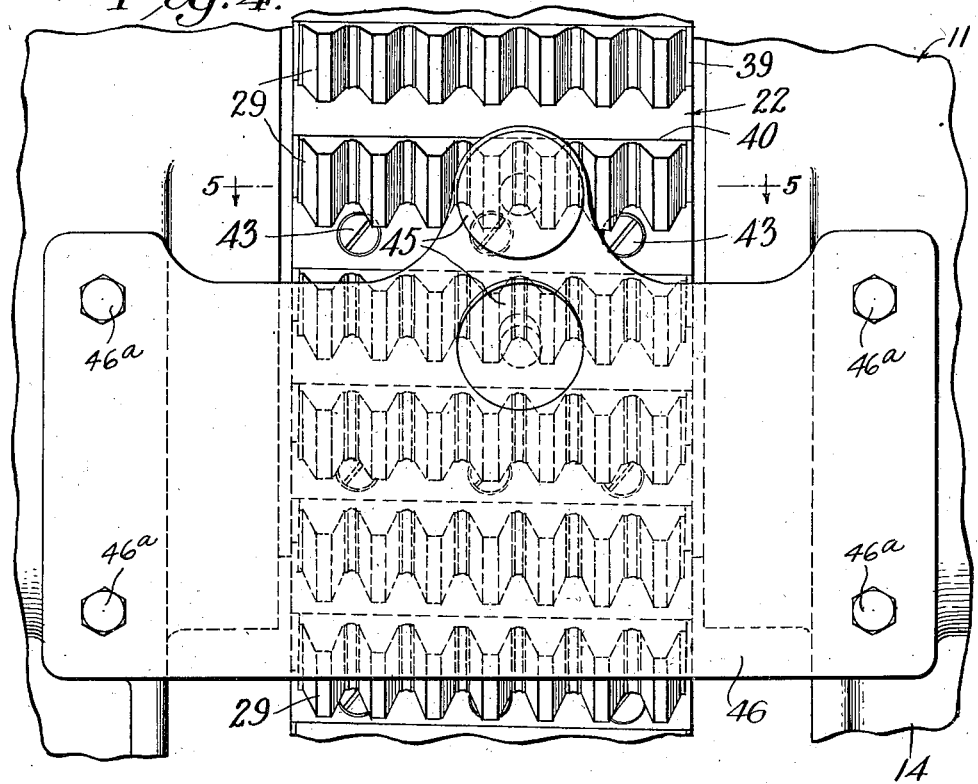
Fig. 4 is a fragmental elevation taken from the left hand of the grinding fixture illustrated in Fig. 1.
Figure 5:
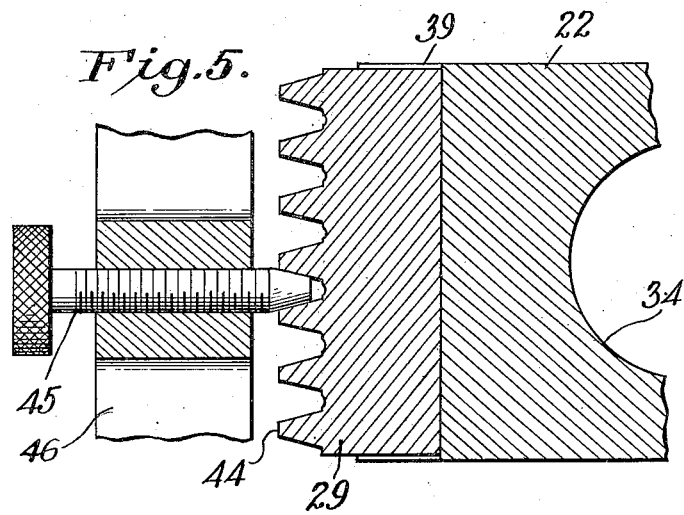
Fig. 5 is a section along the line 5—5 of Fig. 4.

In order to insure setting the tooth elements 29 in peripheral alignment in the grooves of the fixture 11 a device comprising a pair of screw plugs 45 (Figs. 1, 2, 4 and 5) is mounted on the fixture support 11. As illustrated, the mounting for these plugs comprises a plate member 46 removably fixed on the supporting structure by bolts 46ª, the screw plugs being positioned so as to move radially of the fixture 22. Thus by inserting a pair of tooth elements in one of the grooves 39 and rotating the fixture so that a plug 45 may be moved into engagement with teeth of each element as shown in Figs. 4 and 5, the bolts 43 may be tightened to retain the tooth elements in alignment by means of the wedge 42. This process is then repeated for each pair of elements.

With the apparatus such as disclosed herein the invention contemplates that a plurality of abrasive wheels will be provided equal in number to the teeth on each tooth element and that these wheels will be properly dressed to form so that by their engagement with the tooth elements the desired form is provided on the sides of the teeth. As shown most clearly in Fig. 7 the surface 47 of the wheels has been so formed. This may be accomplished by means of a dressing mechanism 13 in which a plurality of diamond pointed dressing devices 48 are mounted. The invention contemplates a dressing mechanism whereby these dressing devices may be moved to provide the desired form to the abrasive wheels such for example as is disclosed and claimed in an application Serial No. 271,432, filed April 20, 1928, by H. D. Colman.

In operating the exemplary form of apparatus, cutter elements 29 are first positioned in the fixture 22, aligned by means of the plugs 45 and clamped by means of wedges 42. Suitable abrasive wheels 12 are mounted on the arbor 6 and dressed to the proper form by means of a dressing mechanism 13. The fixture support 11 is then moved to bring the tooth elements 29 toward the abrasive wheels 12, the support being adjusted transversely of the table by means of a handle 50 on the feed screw 16 so that the abrasive wheels enter the spaces between the teeth and the carriage 3 being adjusted longitudinally so that the abrasive wheels enter said spaces to the desired depth. With the abrasive wheels and fixture 22 in operation in the direction indicated in Fig. 1 the fixture support 11 is then fed laterally to bring the one side of the teeth of the tooth elements into engagement with the abrasive wheels, (the teeth having first been ground to correct diameter). Upon completing one side of the teeth the carriage 3 is returned to the left to withdraw the tooth elements from the abrasive wheels (after the teeth have been given a slight lateral movement by means of the handle 50 to withdraw them from contact with the wheels) and the fixture support 11 is removed from the guides 15 and reversed so that a similar grinding operation may be performed on the other side of the teeth. When the fixture support 11 is reversed, the plate 46 is removed so that the other side of the fixture may be moved into operative relation with the grinding wheels 12.

The invention contemplates a grinding of the cutter teeth such that the teeth are given a circular form, the radius of the grinding circle of the sides of the teeth being approximately equal to the average radius of standard spirally formed teeth. When so ground the teeth are removed from the fixture and inserted in a cutter body such for example as shown as 51 in Figs. 9 and 10. This cutter body is provided with a plurality of laterally extending grooves 52 about its periphery the grooves having walls 53, 54 against which the teeth may be positioned and secured by means of wedges 55 and bolts 56. The walls 53, 54, however, are formed so as to position the teeth at the proper clearance angle and with the faces of the teeth radial.

Figure 9:
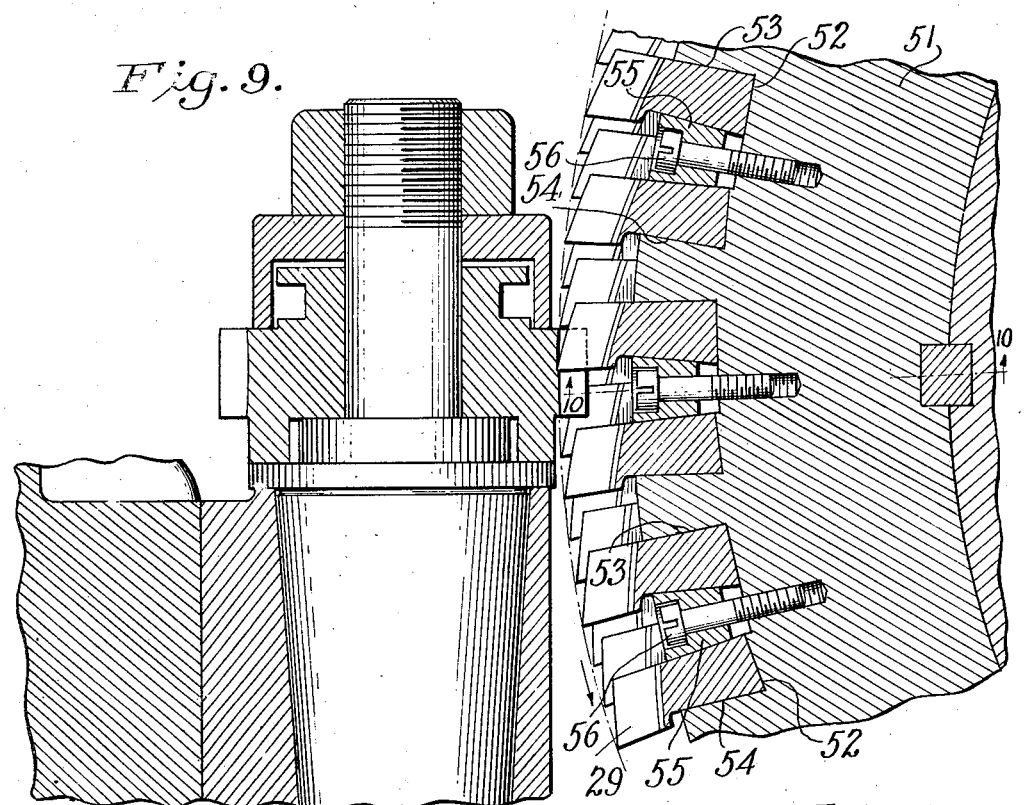
Fig. 9 is a fragmental section taken through a completed gear cutter and showing its relation to a gear being cut.
Figure 10:
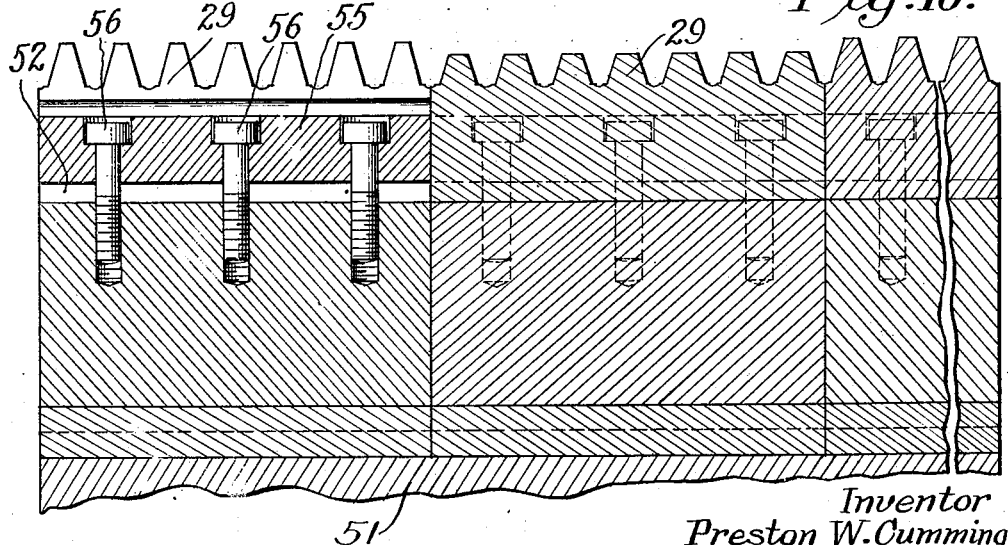
Fig. 10 is a section along the line 10—10 of Fig. 9.

It is believed apparent from the foregoing that I have provided a new and improved method and means for making gear cutters whereby an accurate grinding of the cutter teeth may be obtained at a low cost and in much less time than that required by the back-off method. The teeth are ground during a continuous rotation of the fixture 22. This obtains uniform grinding of the teeth and permits a faster operation than the back-off method. When it is desired to make wide cutters, such for example as illustrated in Figs. 9 and 10, the teeth may be made up in shorter sections, thus requiring but a fraction of the number of abrasive wheels which is required in backing-off gear cutters. This also permits of greater accuracy and a cutter thus formed, having teeth of a circular contour rather than of a spiral, produces substantially equal results with the spirally formed tooth in gear cutters of the type contemplated.

Preferably the grooves 39 in the fixture 22 are positioned at an angle of about one degree to the axis of the support 11 so that when the ground teeth are reset in the grooves of a cutter body which are not offset, additional side clearance is provided for the teeth when they are cutting. It will be understood that since the teeth are ground on one side at a time and the support 11 reversed for the purpose of grinding the other side that proper side clearance will be provided on both sides of the teeth.

I claim as my invention:

1. The method of making a gear cutter having inserted teeth set radially in a cutter body, which comprises, setting the teeth tipped forwardly at a clearance angle in a rotatably mounted fixture, grinding said teeth with a formed abrasive wheel during a rotation of said fixture and mounting the finished teeth radially in the cutter body.

2. The method of making a gear cutter of the inserted tooth type, which comprises, grinding the teeth while mounted in a fixture so that the tops of the teeth are given a circular contour centered on the rotative axis of the fixture and of a radius approximating the average radius of a spirally formed tooth, and mounting said teeth radially in a cutter body.

3. The method of making a gear cutter of the inserted tooth type which comprises mounting the teeth about the periphery of a rotatably supported fixture, grinding the teeth to a circular contour determined solely by the radial position of the teeth in said fixture and centered on the rotative axis of the fixture, said grinding being accomplished during a continuous rotation of said fixtures and resetting the teeth radially in a cutter body.

4. The method of making a gear cutter of the inserted tooth type, which comprises mounting hardened blanks about the periphery of a rotatable supported fixture tipped forwardly at a clearance angle and with the faces of the blanks in planes disposed at a slight angle with the axis of the fixture, finish grinding the blanks to a circular contour during a continuous rotation of said fixture and resetting the blanks radially in a cutter body with the faces of the blanks in planes passing through the axis of said body.

5. A machine for grinding gear cutter teeth comprising a bed, a table slidably mounted thereon, a grinding spindle rotatably mounted above said table, a support adjustably mounted on said table, a grinding fixture rotatably mounted on said support on an axis parallel to said spindle, said fixture being arranged to receive a plurality of sets of cutter teeth spaced about its periphery, means on said support to permit of alining sets of teeth so mounted, a plurality of formed abrasive wheels on said spindle and means to adjust said fixture relatively to said abrasive wheels.

6. A machine of the character described comprising, in combination, a base frame, a grinding spindle rotatably mounted thereon, a plurality of grinding wheels on said spindle, a support mounted on said frame for movement towards and from said spindle, a cylindrical grinding fixture rotatably mounted on said support on an axis parallel to said spindle, said fixture being arranged to receive sets of cutter teeth about its periphery, and means to permit said fixture to be reversed with respect to said spindle and to be brought into operative relation to said grinding wheels while in its reversed position.

7. In a machine of the character described, the combination of a bed, a grinding spindle rotatably supported thereon, a table slidable on said bed transversely of said spindle, a grinding fixture support removably mounted on said table and adjustable thereon in a direction parallel to the axis of said spindle, a fixture rotatably mounted on said support and arranged to receive a plurality of sets of cutter teeth spaced about its periphery, and means to adjust said support on the table arranged to permit the support to be reversed.

8. The method of making a gear cutter of the inserted tooth type, which comprises mounting hardened blanks about the periphery of a rotatably supported fixture with the blanks tipped forwardly at an angle to radii of the fixture, finish grinding the blanks to a circular contour during a continuous rotation of said fixture to produce finished cutter elements, and resetting the blanks radially in the cutter body.

9. The method of making a gear cutter of the inserted tooth type having cutter elements with a side cutting edge, which comprises mounting hardened blanks about the periphery of a rotatably supported fixture with the faces of the blanks in planes disposed at a slight angle with the axis of the fixture, finish grinding the side cutting edges of the blanks during continuous rotation of said fixture to produce finished cutter elements, and setting the cutter elements in a cutter body.

10. A machine of the character described, comprising in combination, a base frame, a grinding spindle rotatably mounted thereon, a plurality of grinding wheels on said spindle, a support mounted on said frame for movement towards and from said spindle, a cylindrical grinding fixture rotatably mounted on said support on an axis parallel to said spindle, said fixture being arranged to receive sets of cutter teeth about its periphery and to clamp said teeth at an angle to the axis of said grinding fixture and tipped forwardly at an angle to the radii of said fixture, and means to permit said fixture to be reversed with respect to said spindle.

11. A machine of the character described comprising, in combination, a base frame, a grinding spindle rotatably mounted thereon, a plurality of grinding wheels on said spindle, a support mounted on said frame for movement towards and from said spindle, a cylindrical fixture rotatably mounted on said support with its axis parallel to said spindle, said fixture being arranged to receive sets of cutter teeth about its periphery positioned at an angle to the axis of said fixture, said grinding wheels being arranged to grind one side of said teeth at a time, and means arranged to permit said fixture to be reversed with respect to said spindle so as to permit grinding of both sides of said teeth by said grinding wheels.

12. A machine of the character described comprising, in combination, a base frame, a grinding spindle rotatably mounted thereon, a plurality of grinding wheels on said spindle, a support mounted on said frame for movement toward and away from said spindle at right angles thereto, a cylindrical grinding fixture rotatably mounted on said support on an axis parallel to said spindle, said fixture being arranged to receive sets of cutter teeth about its periphery, and means to permit said fixture to be reversed with respect to said spindle by rotation about an axis disposed at right angles to the axis of rotation of said fixture and at right angles to the path of movement of said frame, said fixture being arranged so that it may be brought into operative relation to said grinding wheels while in its reversed position.

In testimony whereof, I have hereunto affixed my signature.

PRESTON W. CUMMINGS.